US009488489B2

(12) United States Patent
Hensel et al.

(10) Patent No.: US 9,488,489 B2
(45) Date of Patent: Nov. 8, 2016

(54) PERSONALIZED MAPPING WITH PHOTO TOURS

(71) Applicant: Google Inc., Mountain View, CA (US)

(72) Inventors: Chase Hensel, San Francisco, CA (US); Ze Hong Zhao, Saratoga, CA (US); Wei Liu, Beijing (CN); Guiheng Zhou, Beijing (CN); Shuangfeng Li, Beijing (CN); Liyong Chen, Beijing (CN); Ming Bai, Beijing (CN); Jian Qiao, Sunnyvale, CA (US); Yi Huang, Beijing (CN); Lu Han, Beijing (CN)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/630,022

(22) Filed: Sep. 28, 2012

(65) Prior Publication Data

US 2015/0178561 A1    Jun. 25, 2015

(51) Int. Cl.
*G06F 3/048*       (2013.01)
*G01C 21/36*      (2006.01)
(Continued)

(52) U.S. Cl.
CPC ........... *G01C 21/3647* (2013.01); *G06F 3/048* (2013.01); *G09B 29/007* (2013.01); *G09B 29/106* (2013.01)

(58) Field of Classification Search
CPC .. G06F 17/30274; G06F 8/34; G06F 9/4443; G06F 8/38; G06F 3/04817; G06F 17/3087; G06F 17/30061; G06F 17/30241; G06F 17/30244; G06F 3/04815; H04N 1/00442; G05B 2219/23258
USPC ........................................ 715/838, 854, 763
See application file for complete search history.

(56) References Cited

U.S. PATENT DOCUMENTS 6,199,014 B1    3/2001    Walker et al.
6,351,710 B1    2/2002    Mays
(Continued)

FOREIGN PATENT DOCUMENTS

EP       1404105 A2     3/2004
JP       H10126731 A    5/1998

OTHER PUBLICATIONS

3D Photo Walls: Amazing new way to scan hundreds of images in seconds, copyright VenueView Inc. 2010, accessed at http://venueview.com/3d-photo-wall/, accessed on Sep. 28, 2012, 5 pages.
(Continued)

*Primary Examiner* — Kieu Vu
*Assistant Examiner* — Joy M Weber
(74) *Attorney, Agent, or Firm* — Lerner, David, Littenberg, Krumholz & Mentlik, LLP (57) ABSTRACT

Methods, systems and computer-readable storage mediums encoded with computer programs executed by one or more processors for providing personalized mapping with photo-tours are disclosed. A mapping system provides a map of a geographic region that includes a plurality of selectable image locations within the region, with standardized images of the respective image location that accord with predefined parameters provided by the mapping system. An image location selection from the map is received and it is determined whether the selected image location is associated with one or more photo-tours of non-standardized images that do not according with the predefined parameters. A selection of a particular one of the photo-tours is received, and the set of non-standardized images corresponding to a selected photo-tour for the image location is provided.

20 Claims, 4 Drawing Sheets

(51) Int. Cl.
G09B 29/10 (2006.01)
G09B 29/00 (2006.01)

(56) References Cited

U.S. PATENT DOCUMENTS

| | | | |
|---|---|---|---|
| 6,437,797 | B1 | 8/2002 | Ota |
| 7,096,428 | B2 | 8/2006 | Foote et al. |
| 7,746,376 | B2 | 6/2010 | Mendoza et al. |
| 7,810,037 | B1 | 10/2010 | Edwards et al. |
| 7,873,468 | B2 | 1/2011 | Matsuura et al. |
| 7,925,144 | B2 | 4/2011 | Washisu |
| 7,933,395 | B1* | 4/2011 | Bailly ............... G06F 3/04815 379/201.04 |
| 8,015,172 | B1 | 9/2011 | Cave et al. |
| 8,073,461 | B2 | 12/2011 | Altman et al. |
| 8,131,118 | B1 | 3/2012 | Jing et al. |
| 8,493,408 | B2 | 7/2013 | Williamson et al. |
| 2001/0010546 | A1 | 8/2001 | Chen |
| 2001/0017668 | A1* | 8/2001 | Wilcock ............ G06F 17/30265 348/552 |
| 2002/0122073 | A1* | 9/2002 | Abrams et al. ............... 345/838 |
| 2002/0128766 | A1 | 9/2002 | Petzold et al. |
| 2004/0054428 | A1* | 3/2004 | Sheha ................... G01C 21/20 700/56 |
| 2004/0064338 | A1* | 4/2004 | Shiota et al. ...................... 705/1 |
| 2006/0253781 | A1* | 11/2006 | Pea et al. ...................... 715/723 |
| 2006/0271691 | A1 | 11/2006 | Jacobs et al. |
| 2007/0198182 | A1 | 8/2007 | Singh |
| 2007/0273758 | A1 | 11/2007 | Mendoza et al. |
| 2008/0033641 | A1 | 2/2008 | Medalia |
| 2008/0118184 | A1* | 5/2008 | Panabaker et al. ........... 382/294 |
| 2008/0215964 | A1 | 9/2008 | Abrams et al. |
| 2009/0135178 | A1 | 5/2009 | Aihara et al. |
| 2009/0198354 | A1 | 8/2009 | Wilson |
| 2009/0307222 | A1* | 12/2009 | Matraszek et al. ............... 707/7 |
| 2010/0082194 | A1 | 4/2010 | Yabushita et al. |
| 2010/0111370 | A1 | 5/2010 | Black et al. |
| 2010/0146397 | A1 | 6/2010 | Koch et al. |
| 2010/0259594 | A1 | 10/2010 | Johansson et al. |
| 2010/0259641 | A1* | 10/2010 | Fujimoto ................... 348/231.3 |
| 2010/0325589 | A1* | 12/2010 | Ofek et al. ..................... 715/854 |
| 2011/0118974 | A1 | 5/2011 | Chang et al. |
| 2011/0131597 | A1 | 6/2011 | Cera et al. |
| 2011/0196897 | A1 | 8/2011 | Koch et al. |
| 2011/0211040 | A1 | 9/2011 | Lindemann et al. |
| 2011/0212717 | A1 | 9/2011 | Rhoads et al. |
| 2011/0228112 | A1 | 9/2011 | Kaheel et al. |
| 2011/0231745 | A1 | 9/2011 | Levesque et al. |
| 2011/0280497 | A1 | 11/2011 | Berger et al. |
| 2011/0283210 | A1 | 11/2011 | Berger et al. |
| 2012/0033032 | A1* | 2/2012 | Kankainen ...................... 348/36 |
| 2012/0039546 | A1 | 2/2012 | Berger et al. |
| 2012/0059720 | A1 | 3/2012 | Musabji et al. |
| 2012/0066573 | A1 | 3/2012 | Berger et al. |
| 2012/0082401 | A1 | 4/2012 | Berger et al. |
| 2012/0092266 | A1 | 4/2012 | Akella |
| 2012/0141023 | A1 | 6/2012 | Wang et al. |
| 2012/0200665 | A1 | 8/2012 | Furumura et al. |
| 2012/0246562 | A1 | 9/2012 | Maness et al. |
| 2012/0324373 | A1 | 12/2012 | Halliday et al. |
| 2013/0018574 | A1 | 1/2013 | Adler |
| 2013/0090850 | A1 | 4/2013 | Mays |
| 2013/0103303 | A1 | 4/2013 | Lynch |
| 2013/0151597 | A1* | 6/2013 | Akiya et al. ................... 709/203 |
| 2013/0191359 | A1 | 7/2013 | Meadow et al. |
| 2013/0332856 | A1 | 12/2013 | Sanders et al. |
| 2014/0330814 | A1 | 11/2014 | Li |

OTHER PUBLICATIONS

Debevec, Paul E., "View-Dependent Texture Mapping," in *Modeling and Rendering Architecture from Photographs*, Chapter 6, pp. 81-95, thesis submitted to Computer Science faculty of U.C. Berkeley, United States (Fall 1996).

Fischler, M.A., and Bolles, R.C, "Random Sample Consensus: A Paradigm for Model Fitting with Applications to Image Analysis and Automated Cartography," *Communications of the ACM* 24(6):381-395, ACM United States (1981).

"Microsoft Photosynth: Home," photosynth.net, copyright Microsoft 2008, accessed at http://photosynth.net/default.aspx, accessed on Mar. 22, 2013, 1 page.

O'Connor, Tim, "Make a 3D Photo Tour with Live Search Maps," published Apr. 15, 2008, Windows Live Photo & Video Blog: Official blog for the Windows Live Digital Memories Experience team, blogs.MSDN.com, accessed at http://blogs.msdn.com/b/pix/archive/2008/04/15/make-a-3d-photo-tour-with-live-search-maps.aspx, accessed on Sep. 28, 2012, 2 pages.

Snavely, et al., "Photo Tourism: Exploring Photo Collections in 3D," *ACM Transactions on Graphics* 25(3), Association for Computing Machinery, Inc., United States, 12 pages (Aug. 2006).

Szeliski, R., "Image Alignment and Stitching: A Tutorial," *Foundations and Trends® in Computer Graphics and Vision* 2(1):1-104, Now Publishers, United States (2006).

"Building a Tour (Pano2VR)" [online], retrieved May 5, 2014, <http://ggnome.com/wiki/building_a_Tour_(Pano2VR)>, 14 pages.

"Easypano the Virtual Tour Way" [online], Copyright 2001-2014, <http://www.easypano.com/video-tutorial/>, 1 page.

"Google Business Photos Trusted Agency Training", [online], retrieved Oct. 2, 2013, <https://sites.google.com/google.com/trusted-agency-training/en/pano-editor>, 23 pages.

"Google Earth Outreach Storytelling with maps using Tour Builder", [online], retrieved May 5, 2014, <https://www.google.com/earth/outreach/tutorials/tourbuilder.html>, 38 pages.

"Google Earth Showcase", [online], retrieved May 5, 2014, <https://www.google.com/earth/explore/showcase/>, 5 pages.

"Imagery and Street View Overview" [online], Copyright 2014, <https://support.google.com/maps/answer/3093457?hl=en&rd=1>, 2 pages.

"Kolor Panotour Pro", [online], retrieved Nov. 13, 2013, <http://www.kolor.com/panotour-pro-profesionnal-360-virtual-tour-software-home.html>, 1 page.

"Panotour Pro Documentation", [online], retrieved Nov. 13, 2013, <http://www.autopano.net/wiki-entaction/view/Panotour_Pro_Documentation>, 2 pages.

"Take 100,000 more tours inside Google Earth", Jan. 30, 2013, <https://www.cnet.com/news/take-100000-more-tours-inside-google-earth/>, 3 pages.

"Tour Builder", [online], Copyright 2013, <https://tourbuilder.withgoogle.com/about/faq>, 1 page.

"Using Tours" [online], Copyright 2014, <https://support.google.com/earth/answer/148174?hl=en>, 4 pages.

Boult, et al., "Omnidirectional Video Applications", VAST Lab, copyright 2000, Sep. 15, 2015.

Bradley, D. et al. (Oct. 1-2, 2005). Image-Based Navigation in Real Environments Using Panoramas. IEEE International Workshop on Haptic Audio Environments and their Applications (HAVE'2005)—Have Manuscript 20. National Research Council of Canada, 5 pages.

Chen, B. et al. (2009). Integrated Videos and Maps for Driving Directions. User Interface Science and Technology (Proceedings of UIST 2009), 9 pages. Retrieved from <http://research.microsoft.com/en-us/um/people/cohen/vdd_webpage/>.

Foote, et al., "FlyCam: Practical Panoramic Video and Automatic Camera Control", FX Palo Alto Laboratory, Inc., copyright 2000, pp. 1419-1422.

Google Street View and Driving Directions. Google Driving View. (© 2011). RedTree Software. This web application can be accessed at: <http://www.redtreesoft.com/Google/GoogleDrivingView.htm>.

Google Street View Hyperlapse. (© 2013). Teehan+Lax Labs. This web application can be accessed at: <http://hyperlapse.tllabs.io/>.

http://web.archive.org/web/2013101105523/http://en.wikipedia.org/wiki/Travelling_salesman_problem, archived on Oct. 11, 2013.

Jeremy Pack, Finding the Best Panoramas, Fall 2011, 5 pages.

Kang, et al., "Virtual Navigation of Complex Scenes using Clusters of Cylindrical Panoramic Images", copyright 1998.

Zhao, Q. et al. (Dec. 2013). Cube2Video: Navigate Between Cubic Panoramas in Real-Time. IEEE Transactions on Multimedia, vol. 15, No. 8, pp. 1745-1754.

* cited by examiner

PERSONALIZED MAPPING WITH PHOTO TOURS

BACKGROUND

1. Field

The embodiments herein relate generally to providing personalized mapping with photos.

2. Background

A number of websites provide mapping capabilities that allow a user to enter a start address and a destination address that the website will use to provide the user with directions on how to travel from the start address to the destination address. Some mapping websites will even provide images of the roads or buildings that the user will see along the way. Theses images are often generic or sterile images taken by individuals hired by the company serving the website or a third party. The images are uniform in their look and feel by design, and provided to allow users to gain a sense of familiarity and continuity while viewing the images. Though the images may be useful in guiding a particular user from a start address to a destination, these images do not capture the unique features of a particular area as may be seen by individuals walking around the area on a more casual basis.

BRIEF SUMMARY

In general, one innovative aspect of the subject matter described in this specification may be embodied in a computer-implemented method. As part of the method, a mapping system provides a map of a geographic region that includes selectable image locations within the region. Some of the selectable image locations are associated with standardized images that are provided by the party providing the mapping system. An image location selection from the map is received. It is then determined whether the selected image location is associated with one or more photo-tours of non-standardized images. A selection of a particular one of the photo-tours is received and the set of non-standardized images corresponding to the selected photo-tour for the image location is provided.

Other embodiments of this aspect include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present disclosure makes reference to illustrative embodiments for particular applications, it should be understood that embodiments are not limited thereto. Other embodiments are possible, and modifications can be made to the embodiments within the spirit and scope of the teachings herein, and additional fields in which the embodiments would be of significant utility. Further, when a particular feature, structure, or characteristic is described in connection with some embodiments, it is submitted that it is within the knowledge of one skilled in the relevant art to affect such feature, structure, or characteristic in connection with other embodiments whether or not explicitly described.

Disclosed herein is a system for providing personalized mapping with photo tours. The system may operate in conjunction with a conventional mapping system that allows a user to find directions between two points and view some standardized images taken along a path between the start point and the destination. For example, a mapping system may pay individuals to drive around a city or other geographic location with a camera mounted to a vehicle. The camera may take panoramic images of the driven locations, and those images may be provided by way of a conventional mapping system for users to view.

Disclosed herein is a system for providing personalized mapping. Personalized mapping allows individual users or photographers to supplement the standardized images associated with a map with their own personalized photo tours of various areas, locations, or points-of-interest. These personalized photo tours may allow others to share their view of a particular geographic area in a unique way and allow users of the mapping system to view various geographic areas and events from a personalized point of view, one that they would not be able to experience with standardized images alone.

Figure 1:
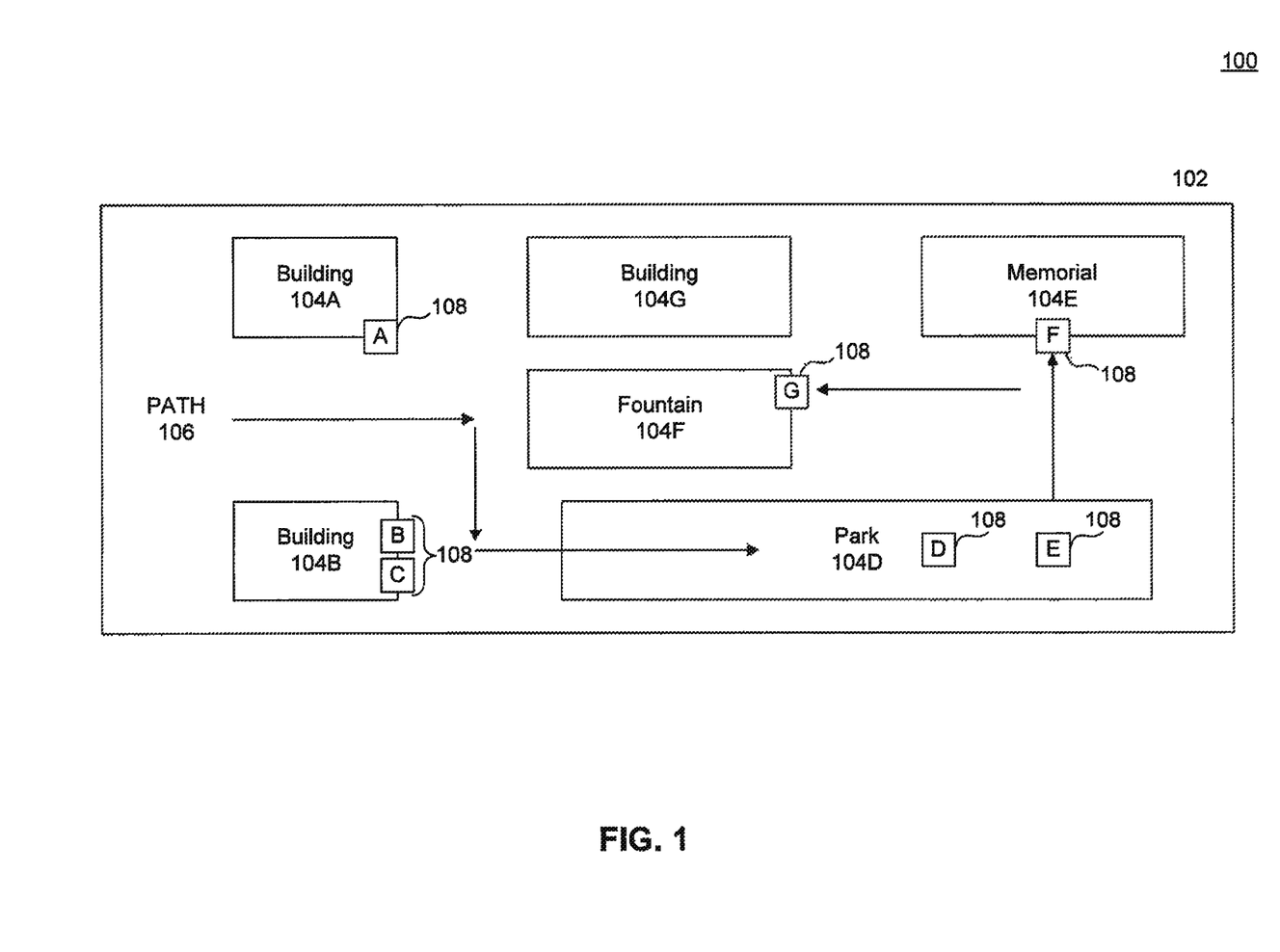
FIG. 1 is a diagram illustrating an example usage of personalized photo-tours for maps, according to an embodiment.

FIG. 1 is a diagram illustrating an example 100 usage of personalized photo-tours for maps, according to an embodiment. FIG. 1 includes a map 102 of a geographic region. The geographic region may be a city, county, state, country, amusement park, subdivision, or any portion thereof or any other geographic area that may be rendered on map 102. As shown, map 102 may include a number of points-of-interest (POIs) 104 for the geographic area. POIs 104 may include any sort of landmarks, buildings, street signs, structures (permanent or temporary), businesses, event locations or other features of the geographic area. Example POIs 104, as shown on map 102, include buildings 104A, 104B, 104G, fountain 104F, park 104D and memorial 104E. Other example embodiments may include other POIs 104, such as a park bench within park, a bus stop, or a mobile vendor cart.

A photographer or other user (not shown), for example, may walk through a geographic region (e.g., such as the region shown on map 102) and capture images of various items, buildings, people, events, or other things the photographer finds interesting. These non-standardized images (NSIs) 108A-G may each have been captured at a different geolocation within the geographic region. NSIs 108 include images, as captured by a photographer, of various subject matter that the photographer deemed interesting. NSIs 108 are not, for example, the standardized images as may be provided by a conventional mapping system.

As shown in FIG. 1, a photographer may have captured NSIs 108A-G at or near various POIs 104 within the geographic region of map 102. NSIs 108 may be of anything the photographer deemed interesting. For example, NSI 108A may be of a person standing near building 104A, NSI 108B may be of a hotdog vendor outside of building 104B, NSI 108D may be of a flower within park 104D, and NSI 108G may be a sign indicating the occurrence of a historical event near fountain 104F.

Each NSI 108 may have its own geotag indicating or approximating where it was captured. NSIs 108, if arranged in the order of capture, may be used to indicate a path 106 as traversed by a photographer through the geographic region of map 102. Path 106 may include any series or sequence of NSIs 108 as arranged or captured within a geographic area and as provided via map 102. For example, as shown, a photographer may have captured NSI 108A near building 104A, walked towards building 104B and captured NSIs 108B and 108C, traveled through park 104D, to memorial 104E, and ended at fountain 104F. Path 106 may correspond to a sequence in which NSIs 108 were captured within a geographic area.

In some embodiments, if a user requests directions from building 104B to memorial 104E, the user may not only be able to view the standardized images as may be provided, but also or alternatively, view NSIs 108 as provided via path 106. This may allow user to have varying views of the same geographic area as captured from multiple viewpoints.

The system described herein allows photographers, for example, to provide their own unique perspectives on various POIs 104 in one or more geographic areas. The photographers may take pictures of whatever they find interesting and upload the NSIs 108 to a mapping system. Other users may then view the personalized path 106 traversed by each photographer and experience a very unique view of a geographic region and/or POIs 104 as captured by each photographer and provided via map 102.

In an example embodiment, these paths 106 or photo-tours of NSIs 108 may have captured historical events occurring in a geographic region, such as, for example, a popularized protest or the visit of a famous dignitary. In some embodiments, the photo-tours of NSIs 108 may be combined with standardized images (such as panoramic images) that may already exist within the mapping system. A user may then view not only what the geographic region looks like when the standardized images were captured, but may also view the difference as it may have looked on the occurrence of some event. Or, for example, a person who is looking for directions from building 104A to memorial 104E may be provided with walking directions, may be able to view standardized images as provided by a mapping system, and may be able to view the NSIs 108 of a photographer who walked path 106.

Figure 2:
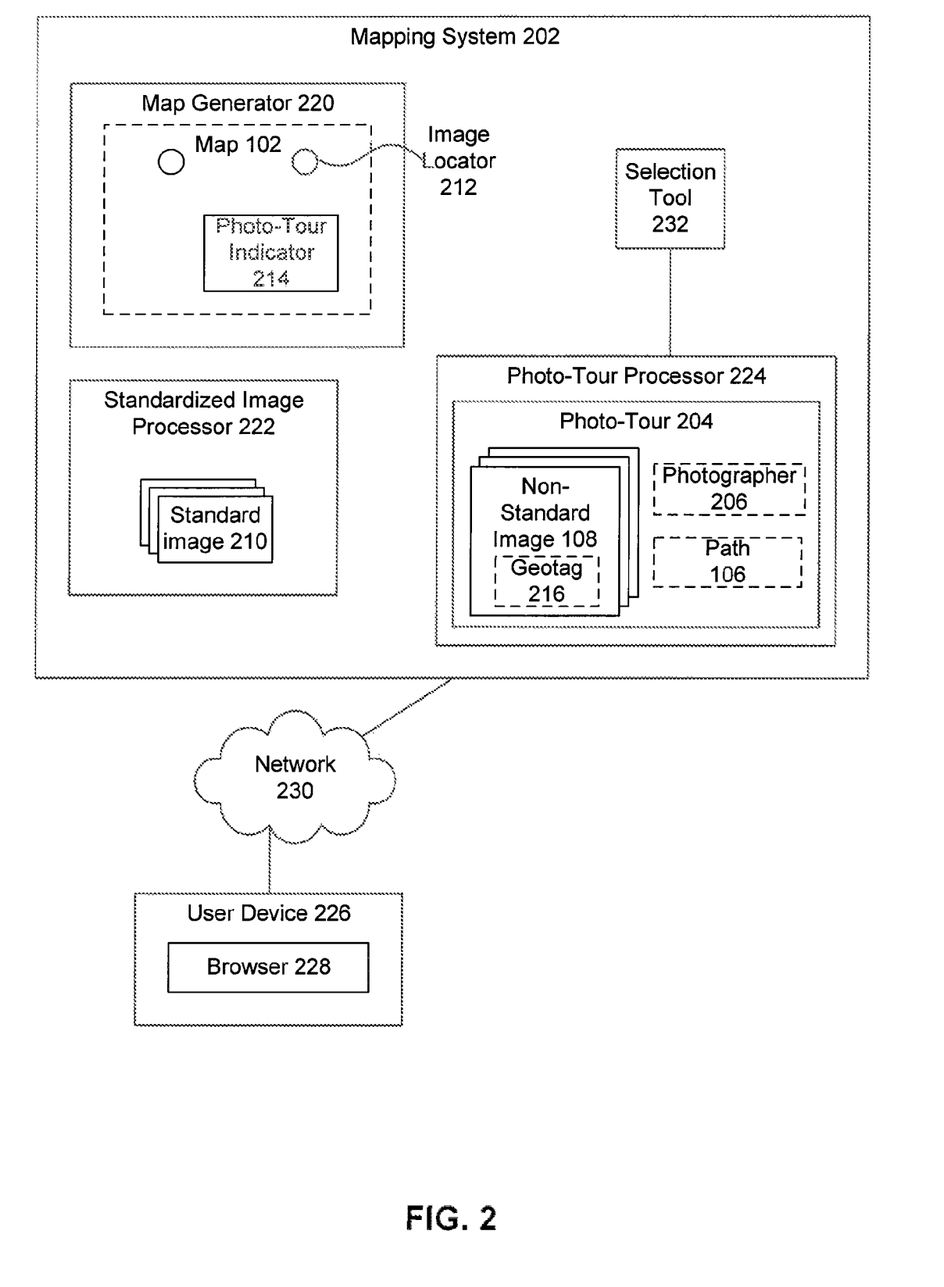
FIG. 2 is a diagram illustrating a system for providing personalized mapping with photo-tours, according to an embodiment.

FIG. 2 is a diagram illustrating a system for providing personalized mapping with photo-tours, according to one embodiment. A mapping system 202 may provide personalized photo-tours for one or more geographic regions. For example, as discussed above with regards to FIG. 1, a photographer 206 may walk or otherwise maneuver around (e.g., take a tour, ride in a car, take a bus, etc.) a geographic region. Photographer 206 may be any person or group of individuals who take pictures or images using their phones, cameras, computers, or other devices. Photographer 206 may walk or move around a geographic region along path 106, which may vary for each photographer 206. While walking through the geographic region, photographer 206 may capture non-standardized images (NSIs) 108 of whatever interests photographer 206 about the geographic region.

NSIs 108, as referenced above, may include any image or photograph taken by photographer 206 in a geographic region. NSIs may include images of people, animals, events, flowers, particular aspects of buildings, signs, structures, items, or anything else photographer 206 desires to capture in a photograph.

NSIs 108 are different from standardized or standard images 210 that may be provided by mapping system 202. Standard images 210 may include images or photographs that accord with some predefined parameters provided by mapping system 202. For example, the predefined parameters may include parameters defining the type of image (e.g., standard, panoramic, three-dimensional), the size of the image, the image resolution, the file format, the date/time of image capture, the camera and/or method of image capture (e.g., driving around in a car with a mounted camera). In some embodiments, mapping system 202 may sponsor, pay, or otherwise commission or compensate people to take panoramic images of particular portions of the geographic region which may be used as standard images 210. For example, an entity, such as a company or organization the provides mapping system 202 may compensate photographers to capture standard images 210. Standard images 210 may then be provided to a user so that the user may view a geographic region where standard images 210 were taken.

NSIs 108, in contrast to standard images 210, may be images taken by any number of photographers 206 who take images of whatever aspects of a geographic region the photographers 206 find interesting. For example, while a standard image 210 may include a photograph of a particular landmark within a geographic region, an NSI 108 may include a photograph of an unusual bird perched on the branch of a tree in the geographic region. Mapping system 202 may then provide both standard images 210 and NSIs 108 for various geographic regions.

Mapping system 202 may provide map 102. Map 102 may be a street map, a topological map, three-dimensional map, or other map of a geographic region. If, for example, a user is looking up directions between two locations, mapping system 202 may provide the directions in conjunction with map 102. The directions may include, for example, a highlighted route that the user is supposed to take to get from a starting point to a destination.

In some embodiments, map 102 may include image locators 212 and photo-tour indicators 214. Image locators 212 may indicate the availability of standard images 210 for the geographic region of map 102. Photo-tour indicators 214 may indicate the availability of a photo-tour 204 for the geographic region of map 102. However, mapping system 202 may have standard images 210 for portions of the geographic region and NSIs 108 for different or overlapping portions of the geographic region, as indicated by the indicators 212 and 214.

A photo-tour 204 may include an arrangement or sequence of NSIs 108 as captured in a geographic region and/or arranged by photographer 206. For example, as shown in FIG. 1, photographer 206 may walk down path 106 through the geographic region and capture NSIs 108A-G. Photographer 206 may then upload these NSIs 108 to mapping system 202 and arrange them in photo-tour 204 such that another user may view photo-tour 204 and see the geographic region as captured along path 106 traversed by photographer 206. Path 106, as traversed by photographer 206, may be shown on map 102.

In some embodiments, photographer 206 may capture NSIs 108 at various locations throughout a geographic region, and may organize them into photo-tour 204 in a different order from which they were captured. For example, NSIs 108A-G, may be captured in the order 108A, 108B, 108C, 108D, 108E, 108F, and 108G, but photographer 206 may arrange NSIs 108A-G in photo-tour 204 in any desired order. In another embodiment, photo-tour 204 may include NSIs 108 captured by multiple photographers 206. Mapping system 202 may then determine path 106 based on the arrangement of NSIs 108 within photo-tour 204.

Each NSI 108 may include a geotag 216. Geotag 216 may include an identifier indicating where the respective NSI 108 was captured. Geotag 216 may correspond to a POI 104, coordinates within a geographic region, a particular intersection, or other approximate location of image capture as indicated by photographer 206. In some embodiments, two or more NSIs 108 provided by a photographer 206 with photo-tour 204 may include the same geotags 216. In another embodiment, geotag 216 may automatically be determined by the camera, mobile phone, or other image capture device that photographer 206 used to capture NSI 108. For example, the camera may include an internal GPS locator and may automatically apply a geotag 216 to an image. Using geotag 216, mapping system may then arrange NSIs 108 at the corresponding locations on map 102 where NSIs 108 were captured.

A map generator 220 may generate map 102 of a geographic region. For example, a user may access mapping system 202 on user device 226 and request map 102 for a particular geographic region, a particular street address, an intersection, a POI 104, or directions. Map 102 may then be provided to user device 226 and may include selectable image locators 212 and/or photo-tour indicators 214.

User device 226 may include any computing device allowing a user to access mapping system 202. For example, user device 226 may include a desktop computer, laptop computer, tablet computer, mobile phone, camera, or other computing device. In some embodiments, user device 226 may operate a browser 228. Browser 228 may be a web browser that allows a user to access, for example, a web page or web application supported by mapping system 202. Through user device 226, a user may enter an address, location, coordinates, or other indication of a region for which the user desires to view a map. Map generator 220 may then generate map 102 that may be provided back to the user over network 230 for display in browser 228.

Network 230 may include any communications network allowing communication between user device 226 and mapping system 202. For example, network 230 may include the Internet, an intranet or other telecommunications network. Requests or selections from a user operating user device 226 may be transmitted over network 230 and responses, such as map 102 including standard images 210 and photo-tours 204 with NSIs 108 may be provided over network 230 to user device 226.

A standardized image processor 222 may provide standard images 210 to corresponding image locations 212 on map 102. For example, commissioned photographers by driving around the city may capture standard images 210 for portions of a city based on parameters or instructions provided by mapping system 202. Standard images 210 may include a geotag (e.g., geotag 216) that indicates where in the city standard image 210 was captured. Standardized image processor 222 may then indicate that standard images 210 are available for various image locations (as identified by image locators 212) or may otherwise provide standard images 210 for requested portions of map 102 for which standards images 210 are available.

In other example embodiments, if standard images 210 are available for an entire geographic area, then map 102 (e.g., of the geographic region) may not include image locators 212. Then, for example, when a user requests to view standard images 210 for portions of map 102, standardized image processor 222 may process the requests and provide the corresponding standard images 210.

A photo-tour processor 224 may provide NSIs 108 as arranged in photo-tours 204 for a user to view. Photo-tour processor 224 may for example, in response to a request or selection of photo-tour indicator 214, provide the corresponding NSIs 108 for the requested photo-tour 204.

In another embodiment, a user may search for photo-tours 204 as provided by a particular photographer 206. Photo-tour processor 224 may then return all photo-tours 204 meeting the user's search criteria. In another embodiment, photo-tour processor 224 may provide a user with the option of viewing the photo-tours 204 for friends of the user as indicated by relationships on one or more electronic social networks.

A user may use selection tool 232 to select which photo-tour(s) 204 to view. A user may search for photo-tours 204 using any specified criteria, such as, for example, relationship within a social network, known photographers, celebrities, events, POIs 104, time of photo-tour 204, or other criteria. In another embodiment, a user may, using selection tool 232, combine and view multiple photo-tours 204 for a particular geographic area or POI 104.

Photo-tours 204, as provide by mapping system 202, may allow photographers 206 to share, and other users to view, unique and individual perspectives of the world as they correspond to a geographic region where the images were captured. Consequentially, system 200 may allow users to view, through the lens of individual photographers 206, how a historical event transformed a particular city. System 200 may also allow a more unique and individualized view of geographic regions than may otherwise be available using conventional mapping systems.

Figure 3:
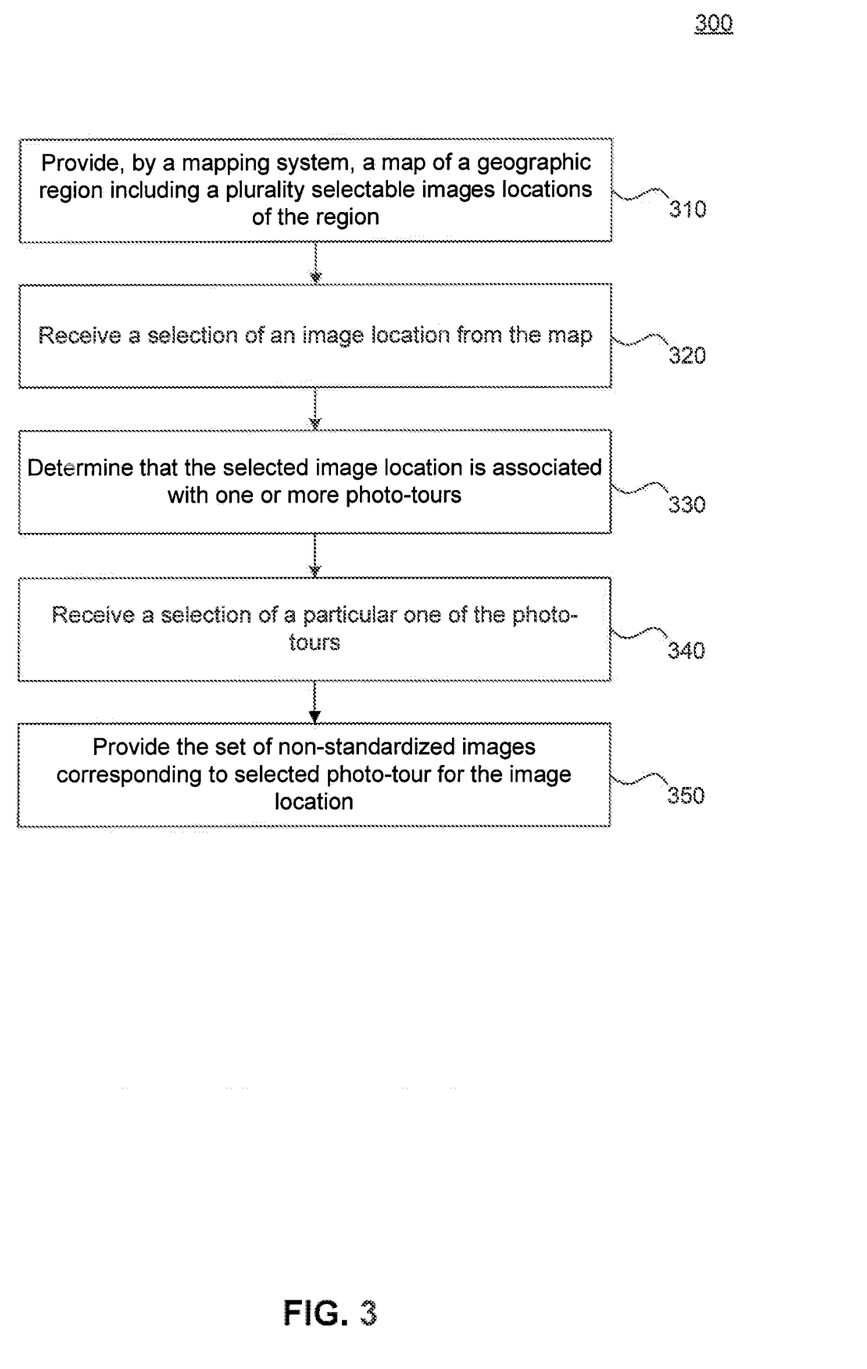
FIG. 3 is a flowchart of a method for providing personalized photo-tours for maps, according to an embodiment.

FIG. 3 is a flowchart of a method 300 for providing personalized photo-tours for maps, according to an embodiment. At stage 310, the mapping system provides a map of a geographic region that includes selectable image locations of the region. For example, mapping system 202 may provide map 102 to a user via user device 226. Map 102 may include selectable image locators 212 and/or photo-tour indicators 214. A user may then select any of the indicators 212 or 214 to view images available for that portion of the geographic area.

At stage 320, a selection of an image location may be received from the map. For example, using his/her mouse or finger, a user may search for and select an image location from map 102. The image location may include any portion of map 102 for which images are available. In some embodiments, the user may search for portions corresponding to photo-tours 204 using selection tool 232.

At stage 330, it is determined whether the selected image location is associated with one or more photo-tours. For example, a selection of photo-tour indicator 214 may be received by photo-tour processor 224. In some embodiments, a user may select an area of map 102 (not corresponding to a photo-tour indicator 214), and photo-tour processor 224 may determine the existence of a closest photo-tour 204 to the selected area. The correspondence between photo-tour 204 and map 102 may be based on, for example, the geotags 216 of the NSIs 108 of a particular photo-tour 204.

At stage 340, a selection of a particular one of the photo-tours is received. For example, photo-tour processor 224 may determine that one or more photo-tours 204 exist for the selected location or selected photo-tour indicator 214. In some embodiments, using selection tool 232, a user may search for photo-tours 204 that match various criteria. Search criteria that may be available via selection tool 232 may include, for example, geographic region, POIs 104, identity of photographer 206 including a relationship with the photographer 206, a particular event, a particular time of photo-tour 204, or other criteria.

At stage 350, a set of non-standardized images corresponding to the selected photo-tour for the image location are provided. For example, photo-tour processor 224 may provide the corresponding NSIs 108 for the selected photo-tour 204 to a user via user device 226. The user may view the NSIs 108 in a particular or special photo-viewer as provided by photo-tour processor 224 or available via user device 226. In some embodiments, a user may view NSIs 108 of a photo-tour 204 overlaid with corresponding standard images 210 of the geographic region or POI 104.

Figure 4:
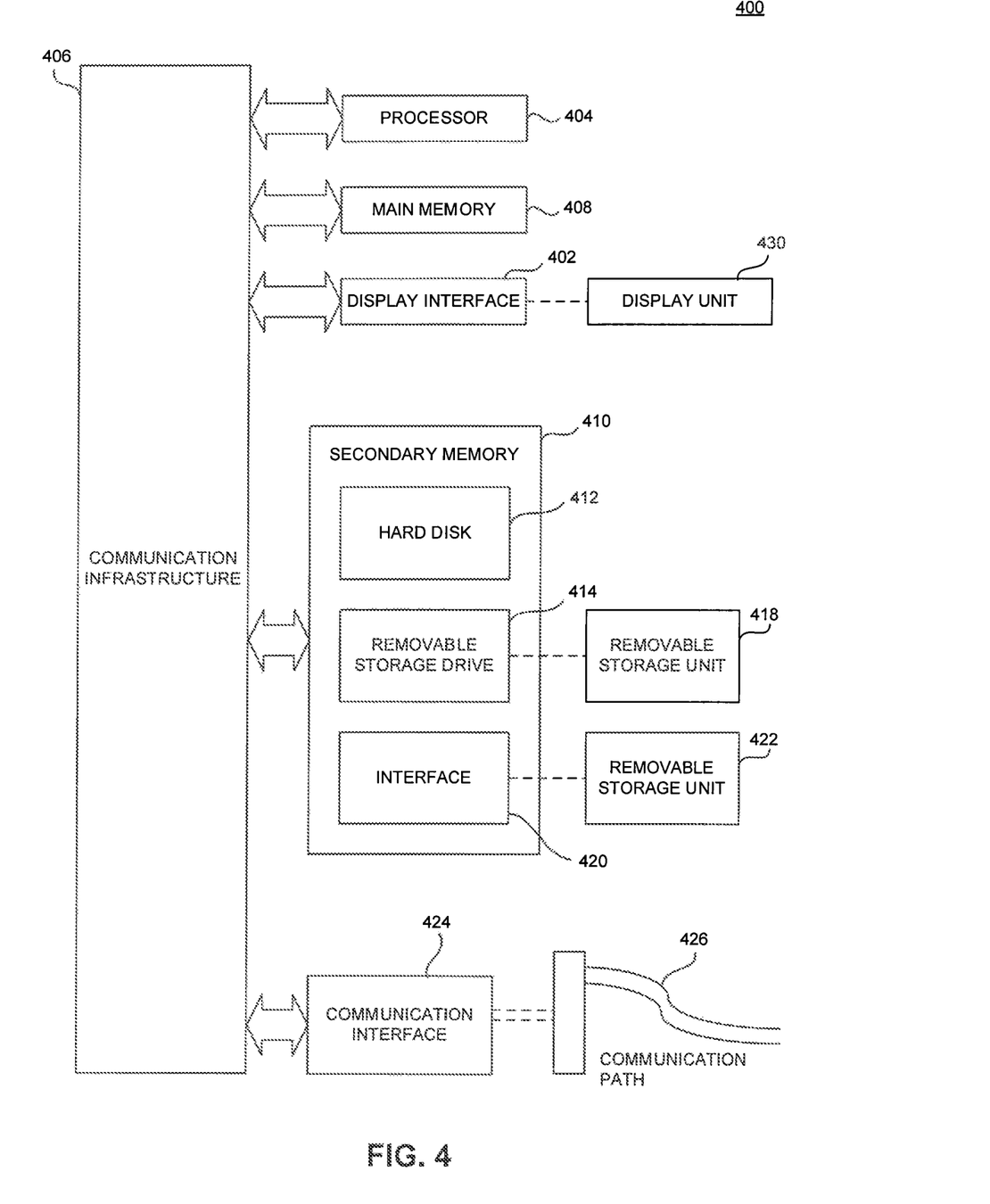
FIG. 4 is a diagram of an exemplary computer system that may be used in an embodiment.

FIG. 4 illustrates an example computer system 400 in which embodiments as described herein, or portions thereof, may be implemented as computer-readable code. For example, mapping system 202, including portions thereof, may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 2-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. The memory may include any non-transitory memory. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system may be operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Main memory may include any kind of tangible memory. Secondary memory 410 may include, for example, a hard disk drive 412, removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored therein computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable medium" are used to generally refer to media such as removable storage unit 418, removable storage unit 422, and a hard disk installed in hard disk drive 412. Such mediums are non-transitory storage mediums. Computer storage medium and computer readable storage medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement embodiments as discussed herein. Where the embodiments are implemented using software, the software may be stored in a computer program product and loaded into computer system 400 using removable storage drive 414, interface 420, and hard disk drive 412, or communications interface 424.

Embodiments also may be directed to computer program products comprising software stored on any computer readable medium as defined herein. Such software, when executed in one or more data processing devices, causes a data processing device(s) to operate as described herein. Embodiments may employ any computer readable storage medium. Examples of computer readable storage mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with some embodiments, it is submitted that it is within the knowledge of one skilled in the art to affect such feature, structure, or characteristic in connection with other embodiments whether or not explicitly described.

The Summary and Abstract sections may set forth one or more but not all exemplary embodiments as contemplated by the inventor(s), and thus, are not intended to limit the described embodiments or the appended claims in any way.

Various embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept as described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described examples, but should be defined only in accordance with the following claims and their equivalents.

What is claimed is:

1. A computer-implemented method for providing personalized maps with photo-tours, comprising:
    receiving, by one or more processors, a selection of a geographic region, wherein the selection of the geographic location is based, at least in part, on a first user input;
    providing, by the one or more processors, based on the selection of the geographic region, a map of the geographic region, including a plurality of selectable image locators and one or more selectable photo-tour indicators overlaid on the map, wherein:
        each selectable image locator is associated with one or more standardized images that are of the selected geographic region and that accord with predefined parameters provided by a mapping system, and
        each photo-tour indicator is associated with one or more photo-tours and each of the one or more photo-tours include a set of non-standardized images provided to the mapping system by a respective user that traversed a path to capture the set of non-standardized images that are of at least a portion of the selected geographic location and that do not accord with the predefined parameters provided by the mapping system;
    receiving, by the one or more processors, a selection of one of the one or more photo-tour indicators overlaid on the map, wherein the selection of the particular one of the one or more photo-tour indicators is based, at least in part, on a second user input; and
    displaying, upon receiving a selection of the one of the one or more photo-tour indicators by the one or more processors, the set of non-standardized images corresponding to the selected particular one of the one or more photo-tour indicators and an indicator representing at least a section of the path of the selected particular one of the one or more photo-tours to an end user.

2. The computer-implemented method of claim 1, wherein the displaying the set of non-standardized images comprises providing the set of non-standardized images in an order as arranged by the respective user that provided the selected particular one of the one or more photo-tours.

3. The computer-implemented method of claim 1, wherein the displaying the set of non-standardized images includes:
    determining that the selected particular one of the one or more photo-tours includes a plurality of non-standardized images, wherein each image includes a spatial relationship to at least one or more other standardized or non-standardized images of the selected particular one of the one or more photo-tours; and
    providing the non-standardized images of the selected particular one of the one or more photo-tours in a sequence based on the spatial relationships between the non-standardized images of the selected particular one of the one or more photo-tours.

4. The computer-implemented method of claim 3, further comprising:
    displaying a first one of the non-standardized images of the selected particular one of the one or more photo-tours at a user device, the first non-standardized image including a plurality of spatial indicators corresponding to the spatial relationships between the first non-standardized image and one or more other non-standardized images of the selected particular one of the one or more photo-tours.

5. The computer-implemented method of claim 4, further comprising:
receiving a selection, from the user device, of a particular spatial indicator on the first non-standardized image; and
displaying a second one of the non-standardized images of the selected particular one of the one or more photo-tours at the user device, the second non-standardized image corresponding to the spatial relationship of the selected spatial indicator.

6. The computer-implemented method of claim 1, further comprising:
determining that the selected photo-tour is a first photo-tour; and
providing the set of non-standardized images of the selected particular one of the one or more photo-tours for display at a user device in a sequence that corresponds to the path the respective user traversed to capture the set of non-standardized images within the selected particular one of the one or more photo-tours.

7. The computer-implemented method of claim 6, further comprising:
wherein the indicator is updated on the map corresponding to an image capture location of a respective one of the set of non-standardized images currently being provided for display on the user device, wherein the image capture location is along the path of the selected particular one of the one or more photo-tours.

8. The computer-implemented method of claim 1, further comprising:
providing a time indicator on the map, wherein the time indicator indicates an image capture time of at least one non-standardized image of the set of non-standardized images of the selected particular one of the one or more photo-tours.

9. The computer-implemented method of claim 1, wherein the one or more standardized images of the selectable image locators are panoramas of the selected geographic region as defined by the predefined parameters, and wherein at least one or more images of the set of non-standardized images of the selected particular one of the one or more photo tours are not panoramic images as defined by the predefined parameters.

10. The computer-implemented method of claim 1, wherein the one or more standardized images of the selectable image locators are provided by one or more other users who receive monetary compensation from an entity associated with the mapping system, and wherein the respective user who provides the set of non-standardized images of the selected particular one of the one or more photo-tours does not receive monetary compensation from the entity.

11. The computer-implemented method of claim 1, wherein the selecting the set of non-standardized images corresponding to the selected particular one of the one or more photo-tours comprises:
selecting the set of non-standardized images corresponding to the selected particular one of the one or more photo-tours in association with one or more of the standardized images.

12. The computer-implemented method of claim 1, wherein the predefined parameters include parameters indicating which portion of the geographic region to capture, when to capture the one or more standardized images, and which camera to use to capture the one or more standardized images.

13. A system comprising:
a map generator configured to generate a map of a geographic region, the map comprising a plurality of selectable image locators and one or more photo-tour indicators overlaid on the map;
a standardized image processor configured to identify the plurality of selectable image locators on the map associated with one or more standardized panoramic images that accord with predefined parameters provided by the mapping system;
a photo-tour processor configured to identify the photo-tour indicators overlaid on the map corresponding to locations for which photo-tours of non-standardized images have been provided, wherein the non-standardized images include images that do not accord with the predefined parameters as provided to the system by one or more users, and wherein each photo-tour comprises a set of the non-standardized images corresponding to a path a respective user traversed to capture at least a portion of the set of the non-standardized images;
a selection tool configured to receive a selection, from a user device, of a first photo-tour indicator from the photo-tour indicators on the map and corresponding to a first photo-tour, from the map for display at the user device; and
wherein the map generator is configured to generate for display, upon receiving a selection of the first photo-tour indicator, an indicator representing at least a section of the path of the selected first photo-tour on the map.

14. The system of claim 13, wherein the photo-tour processor is configured to determine a spatial relationship between the set of non-standardized images of the selected first photo-tour, and provide the set of the non-standardized images of the selected first photo-tour in a sequence based on the spatial relationships between the set of the non-standardized images.

15. The system of claim 13, wherein the photo-tour processor is configured to determine the path based on one or more geotags associated with the set of non-standardized images of the selected first photo-tour.

16. The system of claim 13, wherein the map generator is configured to update the indicator based on a first image of the set of non-standardized images of the selected first photo-tour displayed at the user device, wherein the update indicates a location on the map of the displayed first image of the set of non-standardized images of the selected first photo-tour.

17. A non-transitory computer storage medium implemented by one or more processors and a tangible memory accessible to the one or more processors, the memory comprising code for providing personalized maps with photo-tours that when executed cause the one or more processors to:
receive a selection of a geographic region from a map, wherein the selection of the geographic region is based, at least in part, on a first user input;
provide, based on the selection of the geographic region, a map of the geographic region, including a plurality of selectable image locators and one or more selectable photo-tour indicators overlaid on the map, wherein:
each selectable image locator is associated with one or more standardized images that are of the respective image location that accord with predefined parameters provided by a mapping system, and each photo-tour indicator is associated with one or more photo-tours and each of the one or more photo-tours include a set of non-standardized images provided to the mapping system by a respective user that traversed a path to capture the set of non-standardized images that are of at least a portion of the selected geographic location and that do not accord with the predefined parameters provided by the mapping system;

receive a selection of a particular one of the one or more photo-tours, the particular photo-tour indicator being one of the photo-tour indicators on the map and wherein the selection of the particular one of the photo-tours is based, at least in part, on a second user input; and display, upon receiving a selection of the particular one of the one or more photo-tour indicators, the set of non-standardized images corresponding to the selected particular one of the photo-tours and provide an indicator representing at least a section of the path of the selected particular one of the photo-tours on the map to an end user.

18. The non-transitory computer storage medium of claim 17 wherein the memory comprises code that when executed cause the one or more processors to:

display the selected particular one of the photo-tours via a browser operating on a user device connected to the mapping system over a network, and update the indicator on the map.

19. The non-transitory computer storage medium of claim 18 wherein the memory comprises code that when executed further cause the one or more processors to:

update the indicator as based on the image capture location of a first image of the set of non-standardized images, corresponding to the selected particular one of the photo-tours, displayed on the user device.

20. A computer-implemented method for providing personalized maps with photo-tours, comprising:

receiving, by one or more processors, a photo-tour from a first user, the photo-tour comprising a plurality of non-standardized images that are of at least a portion of a geographic region and that do not accord with predefined parameters provided by a mapping system, wherein the plurality of non-standardized images correspond to a path the first user traversed to capture the plurality of non-standardized images;

providing, by the at least one or more processors, a map of the geographic region including a plurality of selectable image locators associated with one or more standardized images that are of the respective image location that accord with predefined parameters provided by the mapping system, and a photo-tour indicator corresponding to the photo-tour from the first user;

receiving, by the one or more processors, a selection of the photo-tour indicator from the map from a second user; and displaying, upon receiving a selection of the photo-tour indicator from the map from the second user, a first one of the plurality of non-standardized images of the photo-tour to the second user and an indicator representing at least a section of the path of the photo-tour.

\* \* \* \* \*